Aug. 14, 1951   F. BISZANTZ   2,563,914
PORTABLE DRIVE UNIT
Filed Oct. 21, 1947   3 Sheets-Sheet 2
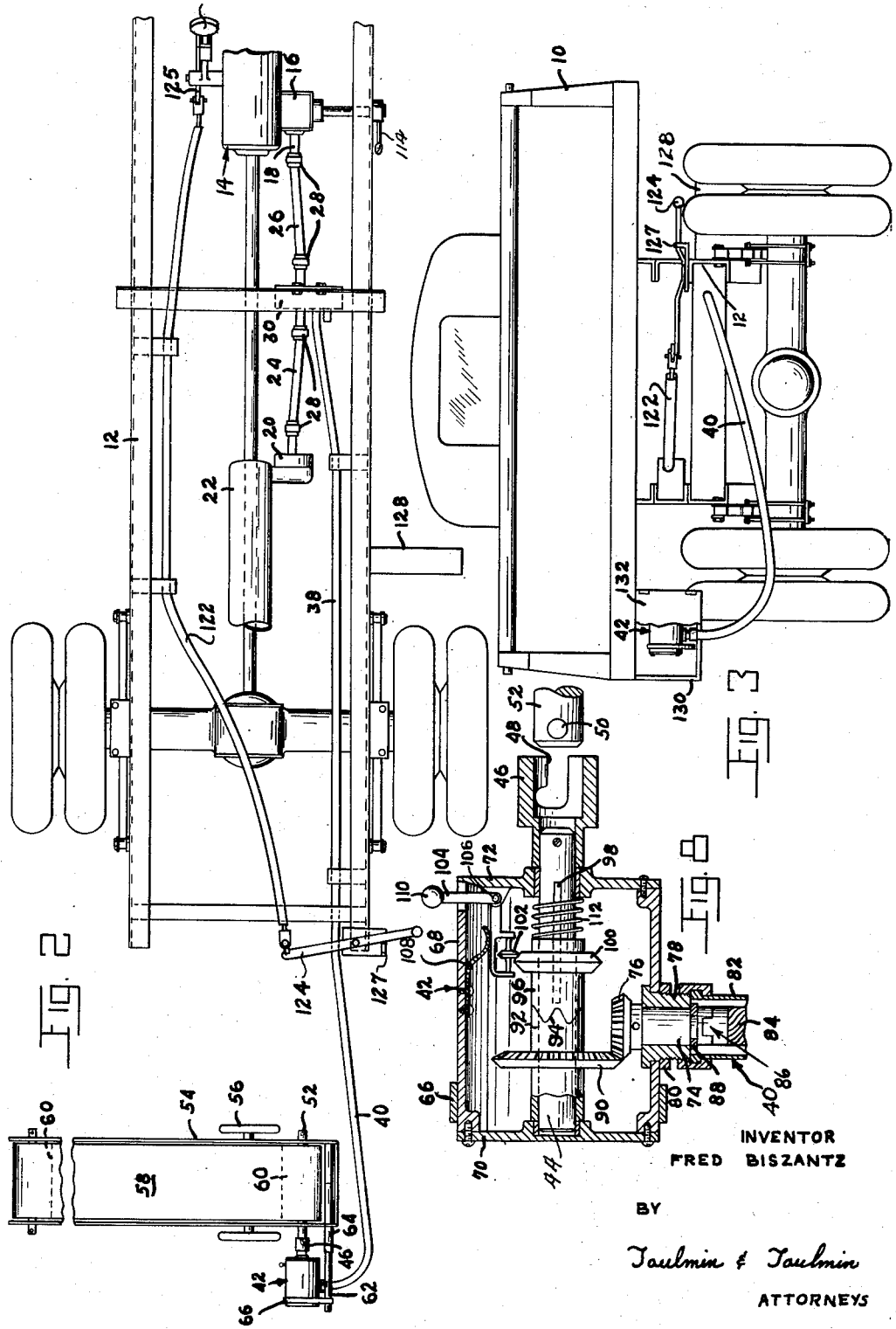
INVENTOR
FRED BISZANTZ
BY
Toulmin & Toulmin
ATTORNEYS Aug. 14, 1951     F. BISZANTZ     2,563,914
PORTABLE DRIVE UNIT
Filed Oct. 21, 1947     3 Sheets-Sheet 3
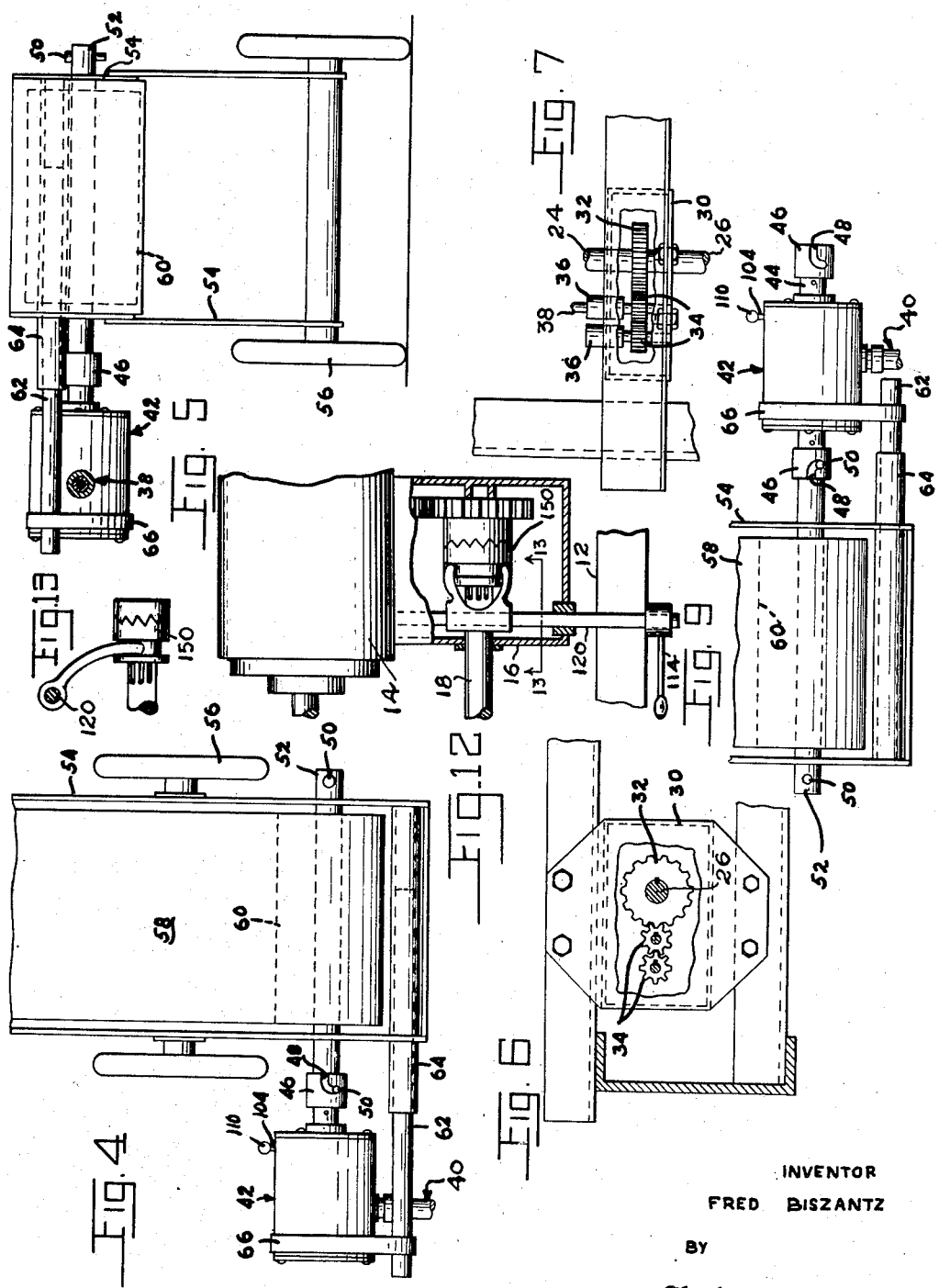
INVENTOR
FRED BISZANTZ
BY
Toulmin & Toulmin
ATTORNEYS Patented Aug. 14, 1951

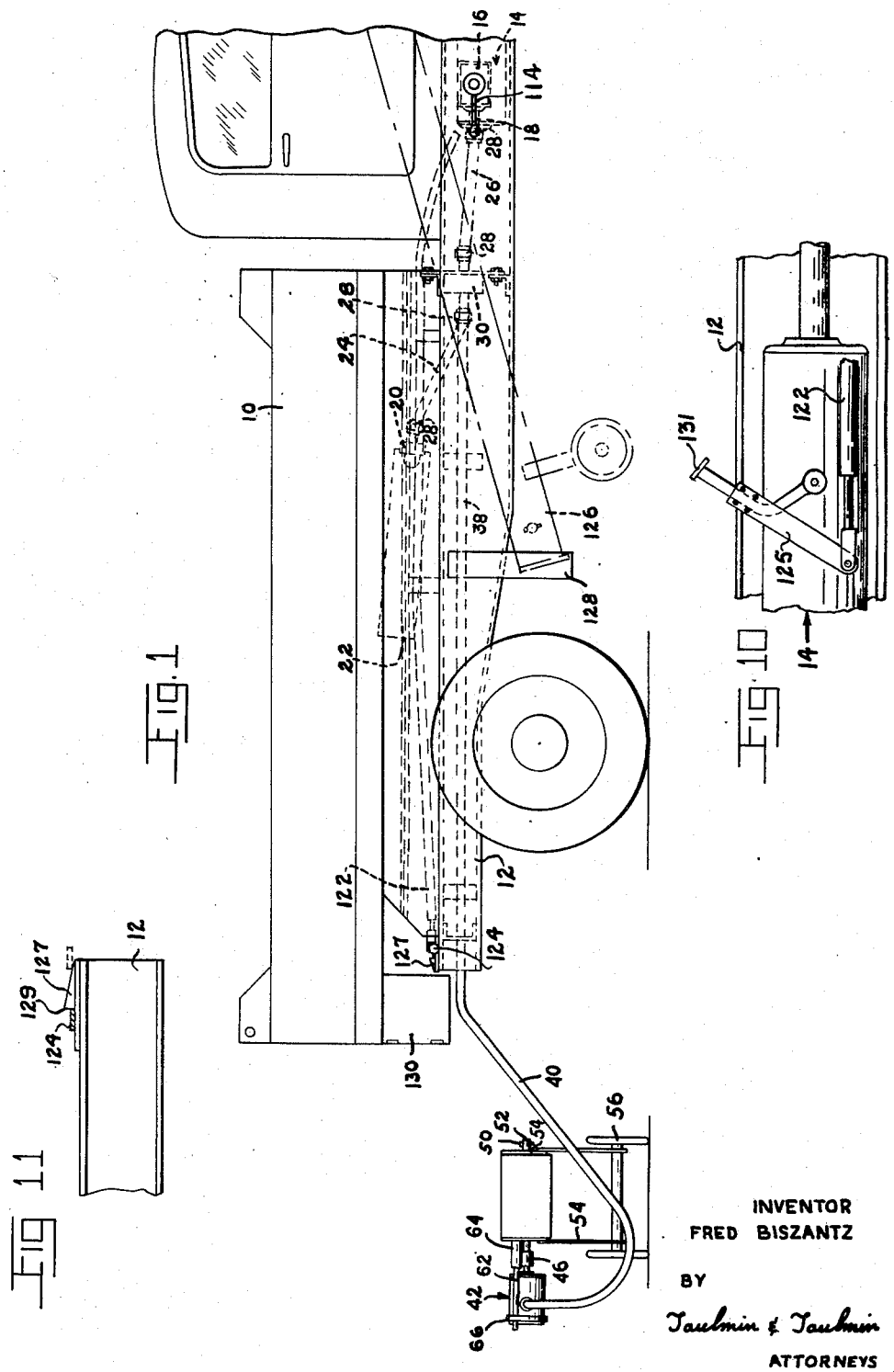

2,563,914

UNITED STATES PATENT OFFICE 2,563,914

PORTABLE DRIVE UNIT

Fred Biszantz, Galion, Ohio, assignor to Hercules Steel Products Co., Galion, Ohio, a corporation of Ohio Application October 21, 1947, Serial No. 781,099

9 Claims. (Cl. 180—53)

This invention relates to drive units, and particularly to a drive unit adapted for being connected with the power take off of a truck or the like for driving a work member such as a conveyor.

In the conveying of materials such as coal by truck, it has been found economical to unload the material and deliver it to the receiving window by a light portable belted conveyor which is carried on the truck to and from the delivery station. Conveyors of this nature must be driven to accomplish their purpose and heretofore there have been three general methods of driving these conveyors as follows:

One method is to employ a small gasoline engine which is carried with the conveyor and which is connected therewith and started when it is desired to drive the conveyor. This is an inconvenient arrangement because the engine is heavy and at times troublesome to start, and is also expensive.

Another method is to employ a hydraulic motor which is driven by a pump connected with the power take off of the truck and which supplies oil under pressure through flexible tubing or hoses to the motor. The motor in this case is usually detachable from the conveyor for transporting purposes. This drive arrangement is to be preferred over the gasoline engine, but represents a troublesome type of drive due to leakage of fluid, breakage of conduits, and other difficulties that are encountered in a flexible hydraulic drive.

A still further arrangement which has been employed is a straight mechanical drive which is generally accomplished by a large bevel gear at the back of the truck and which is driven by the power take off of the truck. This arrangement is bulky and as yet no satisfactory mechanism has been devised for conveying the power from the bevel gear to the conveyor in such a manner that the conveyor can be positioned in any desired location.

The primary object of the present invention is to provide an improved arrangement for conveying power from the power take off of a truck to a belted conveyor of the type referred to above.

Another object is to provide an improved drive for a portable belted conveyor for use in trucks which will permit the positioning of the conveyor in any desired location.

A still further object is the provision of a highly flexible drive from the power take off of a truck to a portable belted conveyor which has means for preventing breakage of any of the drive parts in the event of overload of the conveyor.

It is also an object to provide a very simple mechanical unit driven from the power take off of a truck by a highly flexible shaft which can readily be attached or detached from a portable conveyor and which can be conveyed by the truck without disconnecting it from the power take off thereof.

These and other objects and advantages will become more apparent upon reference to the following description taken in connection with the accompanying drawings in which:

Figure 1 is a side elevation of a typical truck having a power drive to a belted conveyor in accordance with the teachings of this invention;

Figure 2 is a plan view taken over the chassis of the truck and showing more in detail the arrangement of the driving means of this invention;

Figure 3 is a rear view of the truck and shows how the drive unit of this invention is stored and carried by the truck when not in use;

Figure 4 is a somewhat enlarged view over the rear end of the conveyor showing a drive unit according to this invention connected therewith;

Figure 5 is a rear view of the conveyor of Figure 4;

Figure 6 is a view showing a geared unit which is connected between the drive shaft for the power unit of this invention and the power take off of the truck;

Figure 7 is a plan view over the power take off unit shown in Figure 8, showing more in detail the arrangement thereof;

Figure 8 is a sectional view through the drive unit of this invention showing the internal construction thereof and the overload throwout which disengages the unit from its drive shaft in response to a predetermined load thereon;

Figure 9 is a view showing the conveyor as in Figure 4 but with the drive unit therefor mounted on the opposite side;

Figure 10 is a view showing how the clutch of the truck is connected with a control extending toward the rear end of the truck;

Figure 11 is a view of the clutch control lever latching device at the rear end of the truck.

Figure 12 is a view showing the clutch mechanism of the power takeoff;

Figure 13 is a view along line 13—13 of Figure 12.

Referring to the drawings, there is shown a truck having a body 10 which is mounted on a truck chassis 12 in any suitable manner.

As seen in Figures 1 and 2 the truck chassis includes driving mechanism generally indicated at 14 which includes a power take off unit 16 having an output shaft 18.

In general, take off units of the type indicated at 16 are employed for driving a hydraulic pump 20 for the purpose of energizing the tilting motor 22 for lifting the body 10 to discharge the contents thereof.

The connection between the pump 20 and the power take off 16 is accomplished by means of a pair of shafts 24 and 26 which include universal joints as at 28.

Between the shafts 24 and 26 there is a geared unit as at 30, best seen in Figures 6 and 7, which consists of a first gear 32 directly connected between the shafts 24 and 26 and a pair of gears 34 driven by the gear 32 and adapted for operating in respective opposite directions. Each of the gears 34 has an output member 36 which is adapted for receiving the end of a flexible shaft 38. It is to be noted that the speed of rotation of the output member is substantially greater than that of the drive shaft for the input gear 32.

The flexible shaft 38 extends rearwardly of the truck chassis and extends beyond the rearmost end of the chassis as at 40 for being connected with a drive unit generally indicated at 42.

The flexible shaft 38 is preferably a highly flexible unit such as is obtained by wrapping cables into a drive member and mounting them within a flexible conduit. Drives of this nature are strong, exhibit little friction, and are highly flexible without the limitations imposed by universal joints.

The purpose of the geared unit at 30 is to provide for two oppositely rotating power shafts to which the flexible shaft 38 can be connected. The necessity for this is due to the fact that the direction of rotation of the power take off shaft 18 is not fixed but will be clockwise for some trucks and counter-clockwise for others.

By the use of the geared unit 30 it is possible always to have available a power shaft rotating in the proper direction.

The power unit 42 to which the shaft 40 is connected is characterized by a shaft 44 extending therethrough which has mounted on the end thereof the coupling 46. This is best seen in Figure 8 wherein the coupling 46 is seen to comprise a bayonet slot 48 which is adapted for engaging the pins 50 in the drive shaft 52 of the belted conveyor when the said shaft is telescoped into the hollow coupling 46.

As shown in Figure 9, the shaft 44 may extend completely through the unit 42 and carry a coupling 46 at each end. This permits the unit 42 to be placed at either side of the conveyor unit.

The conveyor unit itself may be of any suitable type but as herein shown is a frame 54 mounted on the carrying wheels 56 and having therein a conveyor belt 58 runnig over the pulleys 60, one of which is mounted on the shaft 52 which is driven by the unit 42.

In order to retain the unit 42 against rotation when it is delivering power to the shaft 52, the said unit has secured thereto a pin 62 which extends into a sleeve 64 mounted on the frame 54 of the conveyor unit. The pin 62 may be secured to the unit 42 by means of a clamping band 66 or may extend through lugs integrally cast on the frame of the unit if desired.

Suitable locking means may be provided for clamping the pin 62 to the unit 42, and to the sleeve 64 if desired in order to make the mounting of the unit 42 substantially rigid.

The construction of the unit 42 is shown in detail in Figure 8 wherein it will be seen to comprise a body part 68 having mounted thereon the end members 70 and 72. Extending through one side of the body 68 is a shaft 74 which has mounted on the end thereof a bevel gear 76. The shaft 74 may extend through a bushing 78 which is clamped in the wall of the body 68 by means of a nut 80 and which is adapted for receiving the end of the cable housing 82 of the flexible shaft 38 which also includes a wound drive cable 84. The end of the shaft 74 and the end of the drive cable 84 are adapted for being drivingly engaged by means of a tongue and groove arrangement shown at 86. The shaft 74 is retained in position in the sleeve 78 by means of the ring 88 which prevents axial movement of the said shaft in the said sleeve. A torque is thereby transmitted from the drive cable 84 to the bevel gear 76.

On the output shaft 44 of the unit 42, which extends through at least one of the end members 70 and 72, there is mounted the bevel gear 90 which is continuously in mesh with the aforementioned gear 76. The gear 90 is substantially larger than the gear 76 for effecting a reduction in speed of the output shaft 44.

The gear 90 is mounted for free rotation on the shaft 44 and has a clutch member 92 attached thereto or integral therewith which includes a plurality of substantially V-shaped teeth 94. The teeth 94 are engaged by correspondingly shaped teeth on a second clutch member 96 which is keyed to the shaft by the feather key 98.

The clutch member 96 includes a protuberant cam portion 100 which is engaged by a roller 102 on the end of a bell crank 104 which is pivoted at 106 to the end member 72. A spring 108 continuously urges the roller 102 toward the shaft 44 and into engagement with the side of the cam 100 opposite the teeth 94 so that the teeth of the clutch members are continuously urged into engagement thereby to provide a driving connection from the gear 90 to the shaft 44.

In response to a predetermined resistance to rotation of the shaft 44, there will be relative rotation between the clutch members 92 and 96 thus causing the clutch member 96 to move toward the right until the roller 102 passes the peak of the cam portion 100. At this time the clutch member 96 will snap over to the right into complete disengagement from the clutch member 92 and thereby interrupt the driving connection between the gear 90 and the shaft 44. It will be apparent that this arrangement provides for an overload release which, at any time the conveyor belt encounters a predetermined resistance, will disengage it from the power shaft.

For resetting the power unit to drivingly connect the shaft 44 with the gear 90, the lever 104 may be shifted by the handle 110 at which time the relatively light spring 112 will move the clutch unit 96 back to its Figure 8 position Returning to the power take off 16, take offs of this type generally include a clutch mechanism 150 which can be selectively engaged as by a lever 114 operated from the cab of the vehicle by a shift rod 120 (Figures 1, 2 and 12). In order to enable the operator of the conveyor to control the operation of the power take off from his position at the rear of the truck when the conveyor is operating, a second control comprising a flexible cable and housing as at 122 is provided which extends to the rear of the truck chassis and terminates in a lever 124. The forward end of the cable is connected to the truck clutch pedals by the plate 125 and thus the lever 124 may be shifted for selectively engaging and disengaging the truck engine from the power take off.

At the lever 124 there is a cam plate 127 (Figure 11) which comprises a shoulder 129 over which the said lever may be snapped to hold the clutch disengaged. When the lever is released from the shoulder it moves to the dotted position shown in Figure 11 and the clutch is engaged. The flexible nature of the cable 122 permits normal operation of the clutch pedal 131 at all times the lever 124 is in its unlatched position.

By means of the arrangement described above the operator can selectively energize or de-energize the power take off from either the truck cab or from the rear end of the truck in order to start and stop the conveyor as desired.

The conveyor is adapted for being transported as shown by the dot-dash outline 126 in Figure 1 by means of carrier members as at 128. When the conveyor is being transported, the power unit 42 is disconnected therefrom and is carried, as shown in Figure 3, in a carrier box 130 supported on the underneath side of the body 10 and which may have a closure door 132.

It will be noted that there are no hydraulic connections to disengage and that the flexible shaft 38 permits the positioning of the box 30 in any convenient location beneath the truck body.

By providing the transmission 30 which has the high speed output member 36, the cable 40 may be driven at high speed and, therefore, operate at reduced torque. Because of this a smaller, more flexible cable can be employed for driving any given load, and the chance that the cable will break is minimized. By further providing the reduction gearing 76, 90, the output shaft 44 is driven at the proper speed to drive the load.

It will be apparent from the foregoing, that this invention provides for a very convenient drive unit for being secured to the drive shaft of a portable conveyor unit. The drive unit of this invention is a simple geared unit and is therefore free from operating and maintenance troubles, is inexpensive to manufacture, and by reason of its highly flexible connection with the take off shaft of the truck, is very convenient to manipulate when in use, and to store and transport when not in use.

It will be understood that this invention is susceptible to modification in order to adapt it to different usages and conditions and, accordingly, it is desired to comprehend such modifications within this invention as may fall within the scope of the appended claims.

I claim:

1. A power system on an automotive vehicle comprising in combination, an automotive transmission device including a main power take-off unit connected therewith, automotive clutch means connected with said transmission and including lever means connected therewith for actuation of the said clutch means, actuating means connected with said main power take-off unit for selectively connecting and disconnecting the same with said transmission, an intermediate gear drive unit having a main drive connection therethrough for driving auxiliary equipment and a separate secondary drive connection drivingly connected with said main connection and driven therefrom, a drive shaft drivingly connecting said main power take-off unit with said main drive connection, a flexible drive shaft having one end connected with said secondary drive connection, and a mobile secondary power take-off unit connected at the opposite end of said flexible shaft and driven thereby and including a drive shaft extending therefrom for driving connection with auxiliary equipment.

2. A power system on an automotive vehicle comprising in combination, an automotive transmission device including a main power take-off unit connected therewith, automotive clutch means connected with said transmission and including lever means connected therewith for actuation of the said clutch means, actuating means connected with said main power take-off unit for selectively connecting and disconnecting the same with said transmission, an intermediate gear drive unit having a main drive connection therethrough for driving auxiliary equipment and a separate secondary high speed drive connection drivingly connected with said main connection and driven therefrom at a substantially greater speed than said main connection, a drive shaft drivingly connecting said main power take-off unit with said main drive connection, a flexible drive shaft having one end connected with said secondary drive connection, and a mobile secondary power take-off unit connected at the opposite end of said flexible shaft and driven thereby and including an output drive shaft extending therefrom for driving connection with auxiliary equipment and driven at a low speed substantially less than the driving speed of said flexible shaft.

3. A power system on an automotive vehicle comprising in combination, an automotive transmission device including a main power take-off unit connected therewith, automotive clutch means connected with said transmission and including lever means connected therewith for actuation of the said clutch means, actuating means connected with said main power take-off unit for selectively connecting and disconnecting the same with said transmission, an intermediate gear drive unit having a main drive connection therethrough for driving auxiliary equipment and separate dual secondary oppositely rotating drive connections drivingly connected with said main connection and driven therefrom, a drive shaft drivingly connecting said main power take-off unit with said main drive connection, a flexible drive shaft having one end connectible with either of said dual secondary drive connections and driven from the one connected therewith, and a mobile secondary power take-off unit connected at the opposite end of said flexible shaft and driven thereby and including a drive shaft extending therefrom for driving connection with auxiliary equipment.

4. A power system on an automotive vehicle comprising in combination, an automotive transmission device including a main power take-off unit connected therewith, automotive clutch means connected with said transmission and including lever means connected therewith for actuation of the said clutch means, actuating means connected with said main power take-off unit for selectively connecting and disconnecting the same with said transmission, an intermediate gear drive unit having a main drive connection therethrough for driving auxiliary equipment and a separate secondary drive connection drivingly connected with said main connection and driven therefrom, a drive shaft drivingly connecting said main power take-off unit with said main drive connection, a flexible drive shaft having one end connected with said secondary drive connection, and a mobile secondary power take-off gear set connected at the opposite end of said flexible shaft and driven thereby and including a drive shaft driven by said gear set for driving connection with auxiliary equipment and an overload control means between said gear set and the drive shaft driven thereby.

5. A power system for use on an automotive vehicle and connectible with the power take-off unit of an automotive transmission that comprises in combination, a gear drive unit having a main drive connection therethrough connectible at opposite ends with a power take-off unit and with auxiliary equipment to drive the auxiliary equipment for the power take-off unit, said gear drive unit including dual secondary oppositely rotating drive connections drivingly connected with said main drive connection and driven therefrom, a flexible drive shaft connectible with either of said dual drive connections and driven thereby, a second gear drive unit connected with said flexible drive shaft at the opposite end thereof and including a drive shaft extending from said second gear drive unit and driven thereby, and an overload control means drivingly interconnected with said flexible drive shaft and the gears of said second gear drive unit.

6. A power system for use on an automotive vehicle and connectible with the power take-off unit of an automotive transmission that comprises in combination, a flexible shaft, a gear unit connected with said shaft at one end thereof for driving said shaft and comprising a main drive gear having a main drive shaft extending through said unit for external driving connection at opposite ends thereof and a pair of oppositely rotating auxiliary gears driven by said main drive gear each of which has a drive shaft extending from said unit and connectible with said flexible drive shaft for driving the same, and a second gear unit connected at the opposite end of said flexible drive shaft and comprising a pair of meshing bevel gears one of which is connected with said drive shaft and the other of which is driven by the said one gear, a drive shaft extending from said second gear unit and an overload clutch drivingly interconnecting said drive shaft and the said other of said bevel gears.

7. An automotive vehicle and power system on the same comprising in combination, a vehicle chassis, an automotive transmission in said chassis and including a main power take-off unit connected therewith, automotive clutch means connected with said transmission and including lever means connected therewith for actuation of the said clutch means, actuating means connected with said main power take-off unit for selectively connecting and disconnecting the same with said transmission, actuating means connected with said lever means and extending to the rear of said chassis for actuation of said lever means and thus said automotive clutch from the rear of said chassis, an intermediate gear drive unit having a main drive connection therethrough for driving auxiliary equipment and a separate secondary drive connection drivingly connected with said main connection and driven therefrom, a drive shaft drivingly connecting said main power take-off unit with said main drive connection, a flexible drive shaft having one end connected with said secondary drive connection and the opposite end extending beyond the rear of said chassis and unconnected therewith for complete freedom of movement thereof therebeyond relative to said chassis, and a mobile secondary power take-off unit connected at the opposite end of said flexible shaft and driven thereby and including a drive shaft extending therefrom for driving connection with auxiliary equipment.

8. An automotive vehicle and power system on the same comprising in combination, a vehicle chassis, an automotive transmission in said chassis and including a main power take-off unit connected therewith, automotive clutch means connected with said transmission and including lever means connected therewith for actuation of the said clutch means, actuating means connected with said main power take-off unit for selectively connecting and disconnecting the same with said transmission, actuating means connected with said lever means and extending to the rear of said chassis for actuation of said lever means and thus said automotive clutch from the rear of said chassis, an intermediate gear drive unit having a main drive connection therethrough for driving auxiliary equipment and a separate secondary drive connection drivingly connected with said main connection and driven therefrom, a drive shaft drivingly connecting said main power take-off unit with said main drive connection, a flexible drive shaft having one end connected with said secondary drive connection and the opposite end extending beyond the rear of said chassis and unconnected therewith for complete freedom of movement thereof therebeyond relative to said chassis, a mobile secondary power take-off unit connected at the opposite end of said flexible shaft and driven thereby and including a drive shaft extending therefrom for driving connection with auxiliary equipment, and an arm extending from said mobile power take-off unit for engagement with auxiliary equipment driven thereby to prevent rotation of the said power unit while driving the auxiliary equipment.

9. An automotive vehicle and power system on the same comprising in combination, a vehicle chassis, an automotive transmission in said chassis and including a main power take-off unit connected therewith, automotive clutch means connected with said transmission and including lever means connected therewith for actuation of the said clutch means, actuating means connected with said main power take-off unit for selectively connecting and disconnecting the same with said transmission, actuating means connected with said lever means and extending to the rear of said chassis for actuation of said lever means and thus said automotive clutch from the rear of said chassis, an intermediate gear drive unit having a main drive connection therethrough for driving auxiliary equipment and a separate secondary drive connection drivingly connected with said main connection and driven therefrom, a drive shaft drivingly connecting said main power take-off unit with said main drive connection, a flexible drive shaft having one end connected with said secondary drive connection and the opposite end extending beyond the rear of said chassis and unconnected therewith for complete freedom of movement thereof therebeyond relative to said chassis, a mobile secondary power take-off unit connected at the opposite end of said flexible shaft and driven thereby and including a drive shaft extending therefrom for driving connection with auxiliary equipment, and means at the rear end of said chassis forming support means for said mobile power unit to carry the same when not in use.

FRED BISZANTZ.

REFERENCES CITED

The following references are of record in the file of this patent:

UNITED STATES PATENTS

| Number | Name | Date |
|---|---|---|
| 902,527 | French | Oct. 27, 1908 |
| 1,536,081 | Dean | May 5, 1925 |
| 1,536,157 | Slack | May 5, 1925 |
| 1,638,054 | Myers | Aug. 9, 1927 |
| 1,940,724 | Mizzy et al. | Dec. 26, 1933 |
| 1,952,301 | Webb | Mar. 27, 1934 |
| 2,137,940 | Goodman | Nov. 22, 1938 |
| 2,167,749 | Grohn | Aug. 1, 1939 |
| 2,252,871 | Sohl | Aug. 19, 1941 |
| 2,255,234 | Uhler | Sept. 9, 1941 |
| 2,276,000 | Stumpf | Mar. 10, 1942 |

FOREIGN PATENTS

| Number | Country | Date |
|---|---|---|
| 421,858 | Great Britain | Jan. 1, 1935 |